July 3, 1934.  J. R. ACKERMAN  1,965,208
WATER HEATER
Original Filed Aug. 27, 1931
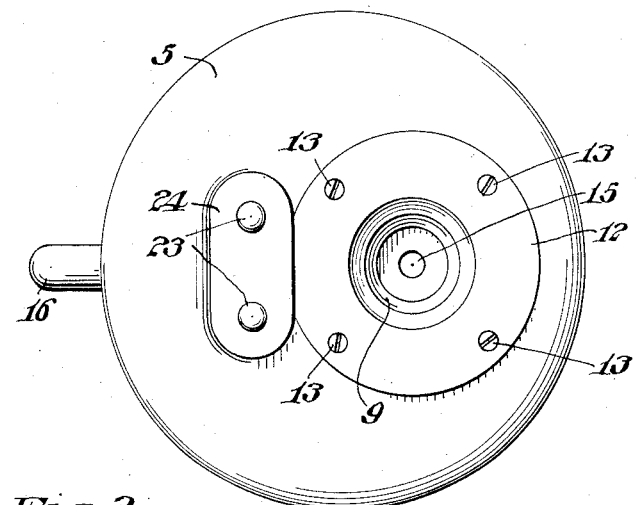
Fig. 2.
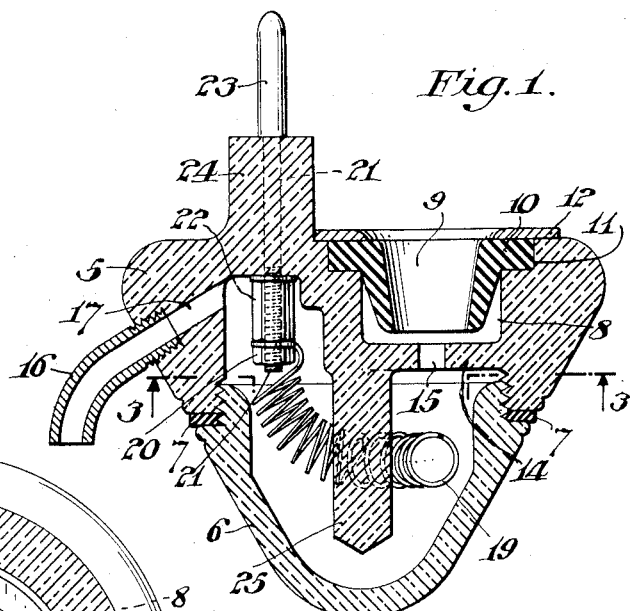
Fig. 1.
Fig. 3.
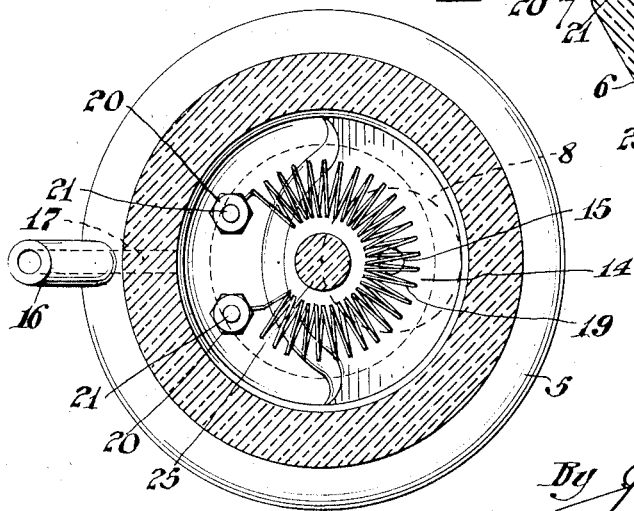
Inventor:
John R. Ackerman,
By Jas. C. Wobensmith
Attorney.

Patented July 3, 1934

UNITED STATES PATENT OFFICE 1,965,208

WATER HEATER

John R. Ackerman, Wayne, Pa., assignor to J. R. Ackerman Corporation, a corporation of Delaware Application August 27, 1931, Serial No. 559,663
Renewed August 5, 1933

11 Claims. (Cl. 219—39)

My invention relates to water heaters, and it relates more particularly to a water heater of the type which is adapted to be detachably mounted on a faucet, and having an internal electrically heated wire coil for heating the water as it passes through the device.

The principal object of my invention is to provide a simple, efficient, and relatively inexpensive device, adapted to be detachably secured to a faucet, whereby a supply of hot water may be quickly obtained when and as desired.

With the foregoing object in view, my invention contemplates the provision of a novel form of casing which may be readily molded of insulating material and which is so shaped that the attachment of the device to the faucet will be greatly facilitated.

My invention further contemplates the provision of such a device containing a simple form of heating unit which may be conveniently and inexpensively renewed when necessary.

My invention further contemplates the provision of an electric water heater, the casing of which is made of two separable parts, whereby access may be had to the interior for the purpose of cleansing the same, and for renewing the heating unit.

My invention further contemplates the provision, in a water heater of the type aforesaid, of means for preventing disarrangement of the heating unit and for preventing short-circuiting of the same by the faucet to which the device is attached.

The nature and characteristic features of my invention will be more readily understood from the following description, taken in connection with the accompanying drawing forming part hereof, in which:

Figure 1 is a vertical, central, sectional view of a water heater embodying the main features of my invention;

Fig. 2 is a top or plan view thereof; and

Fig. 3 is a horizontal section, taken approximately on the line 3—3 of Fig. 1.

Referring to the drawing, in the particular embodiment of my invention therein shown, the device comprises a hollow casing, preferably made of insulating material and of inverted conical form, adapted to be detachably mounted on a faucet, and having a wire coil in the interior thereof, which is adapted to be electrically heated as the water passes from the faucet through the device.

The conical casing comprises an upper portion 5 and a lower portion 6, in threaded engagement with each other, whereby the same may be separated to permit access to the interior. A rubber washer 7 is interposed between the adjacent rims of the two portions 5 and 6.

The upper portion 5 of the casing is provided with a cylindrical recess 8, in which a faucet connection washer 9 is positioned, being held therein by the flange portion 10 of said washer being seated in an annular recess 11. A metal washer 12, secured to the upper portion 5 of the casing by means of screws 13, serves to hold the flange portion 10 of the washer 9 in the recess 11.

A horizontal partition 14 separates the recess 8, in which the connection washer 9 is positioned, from the main chamber provided in the interior of the casing. An aperture 15 is provided in the horizontal partition 14, permitting the water to flow from the faucet to the main chamber of the device.

An outlet nozzle 16 is mounted in the upper portion 5 of the casing, the outer end of the same being bent downwardly so as to deliver the heated water in the proper direction. The interior of the nozzle 16 communicates, by means of a port 17, with that portion of the internal chamber which is provided by the hollow interior of the upper portion 5 of the casing, it being noted that the port 17 extends to the uppermost portion of said chamber.

A wire coil 19 is mounted in the internal chamber of the casing. The ends of the coil 19 are secured by nuts 20 to the inner ends of connection posts 21. Elongated nuts 22 are threaded on the connection posts 21, and interposed between the ends of the coil and the inner surface of the upper portion of the casing 5, where the connection posts extend through the same. The outer ends of the connection posts are enlarged and of pin-like form, as at 23, and the ends 23 of the connection posts 21 are so spaced that the slip connection, such as is commonly used for attaching connection cords, may engage the same.

A lug 24, preferably integral with the upper portion 5 of the casing, extends upwardly therefrom, the connection posts 21 extending therethrough. By this arrangement, the connection pins 23 are elevated to a position whereby likelihood of water from the faucet coming in contact therewith is avoided.

The coil 19 is disposed within the chamber in arcuate form (see Fig. 3), and for the purpose of preventing the same from becoming displaced, whereby it might become short-circuited intermediate its ends, there is provided a centrally arranged post 25, preferably extending downwardly from the upper portion 5 of the casing, and also preferably made integral therewith.

When it is desired to use the device, the washer 9 is brought into engagement with the end of the faucet, and the device pushed upwardly to the proper position, the inverted conical shape of the casing facilitating the handling of the device, and enabling it to be pushed to the proper position for engagement with the end of the faucet. Furthermore, the inverted conical shape of the casing permits the device to be mounted on faucets at places where a non-tapering device could not be positioned, and where the device is used in connection with a basin or sink, this peculiar shape permits the placing under the device of various utensils to receive the heated water, which would not otherwise be possible.

After the device is mounted on the faucet, the water is turned on until the hollow interior of the casing becomes filled with water. The device may then be connected by means of a connection cord, of the type commonly used for connecting electrical appliances to the usual electrical outlets. The resistance coil will then become heated, and the heat thereof imparted directly to the water which is passing through the device.

It will be noted that the horizontal partition 14 will prevent the end of the faucet from coming in contact with the resistance wire, which otherwise might result in dangerous short-circuiting. The peculiar shape of the lower portion 6 of the casing provides a sediment basin in which impurities, which are precipitated by the heating of the water, may be permitted to collect.

When it is desired to clean the device, or to renew the heating coil, the lower portion 6 of the casing may be unscrewed, and access had to the interior. The heating element may be readily removed by unscrewing the nuts 20 which are mounted on the inner ends of the connection posts 21.

The elongated nuts 22 serve to maintain all portions of the heating coil below the level of the outlet port 17, which will prevent burning out at the point of connection, as sometimes occurs in devices of this character, where portions of the wire are permitted to become heated in the absence of water contacting therewith.

I claim:

1. A water heater of the type which is adapted to be detachably mounted on a faucet comprising a casing made of separable upper and lower portions and having an internal chamber, said casing being externally of inverted conical shape, faucet engaging means carried by the upper portion of the casing, a discharge nozzle, the casing having an outlet port forming a communication between the top of the internal chamber and said discharge nozzle, a resistance coil mounted within said chamber, and means for electrically connecting the ends of the resistance coil to a source of current.

2. A water heater of the type which is adapted to be detachably mounted on a faucet comprising a casing made of separable upper and lower portions and having an internal chamber, said casing being externally of inverted conical shape, faucet engaging means carried by the upper portion of the casing, a discharge nozzle, the casing having an outlet port forming a communication between the top of the internal chamber and said discharge nozzle, a resistance coil mounted within said chamber and disposed entirely below the level of the outlet port, and means for electrically connecting the ends of the resistance coil to a source of current.

3. A water heater comprising a casing made of separable upper and lower portions and having an internal chamber, faucet engaging means carried by the upper portion of the casing, a discharge nozzle, the casing having an outlet port forming a communication between the top of the internal chamber and said discharge nozzle, a resistance coil mounted within said chamber and disposed entirely below the level of the outlet port, means for electrically connecting the ends of the resistance coil to a source of current and a post formed on one of said separable portions and centrally arranged within the internal chamber adapted to prevent disarrangement of the resistance coil.

4. A water heater comprising a casing made of separable upper and lower portions and having an internal chamber, the upper portion of the casing having a recess in the top thereof, a faucet engaging washer secured in said recess, a horizontal partition separating said recess from the internal chamber, said partition having an aperture permitting the passage of water to the internal chamber, a discharge nozzle, the casing having an outlet port forming a communication between the top of the internal chamber and said discharge nozzle, a resistance coil mounted within said chamber, and means for electrically connecting the ends of the resistance coil to a source of current.

5. A water heater comprising a casing made of separable upper and lower portions and having an internal chamber, the upper portion of the casing having a recess in the top thereof, a faucet engaging washer secured in said recess, a horizontal partition separating said recess from the internal chamber, said partition having an aperture permitting the passage of water to the internal chamber, a discharge nozzle, the casing having an outlet port forming a communication between the top of the internal chamber and said discharge nozzle, a resistance coil mounted within said chamber and disposed entirely below the level of the outlet port, and means for electrically connecting the ends of the resistance coil to a source of current.

6. A water heater comprising a casing made of separable upper and lower portions and having an internal chamber, the upper portion of the casing having a recess in the top thereof, a faucet engaging washer secured in said recess, a horizontal partition separating said recess from the internal chamber, said partition having an aperture permitting the passage of water to the internal chamber, a discharge nozzle, the upper portion of the casing having an outlet port forming a communication between the top of the internal chamber and said discharge nozzle, a resistance coil mounted within said chamber, means for electrically connecting the ends of the resistance coil to a source of current, and a post centrally arranged within the internal chamber adapted to prevent disarrangement of the resistance coil.

7. A water heater comprising an inverted conical casing made of separable upper and lower portions and having an internal chamber, faucet engaging means carried by the casing, a discharge nozzle, the casing having an outlet port forming a communication between the top of the internal chamber and said discharge nozzle, a resistance coil mounted within said chamber, connection posts extending through the casing the outer ends of which are adapted to be electrically connected to a source of current, and means for connecting the ends of the resistance coil to the inner ends of the connection posts.

8. A water heater comprising an inverted conical casing made of separable upper and lower portions and having an internal chamber, the upper portion of the casing having a recess in the top thereof, a faucet engaging washer secured in said recess, a horizontal partition separating said recess from the internal chamber, said partition having an aperture permitting the passage of water to the internal chamber, a discharge nozzle, the upper portion of the casing having an outlet port forming a communication between the top of the internal chamber and said discharge nozzle, a resistance coil mounted within said chamber, connection posts extending through the casing the outer ends of which are adapted to be electrically connected to a source of current, and means for connecting the ends of the resistance coil to the inner ends of the connection posts.

9. A water heater comprising an inverted conical casing made of separable upper and lower portions and having an internal chamber, the upper portion of the casing having a recess in the top thereof, a faucet engaging washer secured in said recess, a horizontal partition separating said recess from the internal chamber, said partition having an aperture permitting the passage of water to the internal chamber, a discharge nozzle, the upper portion of the casing having an outlet port forming a communication between the top of the internal chamber and said discharge nozzle, a resistance coil mounted within said chamber, connection posts extending through the upper portion of the casing the outer ends of which are adapted to be electrically connected to a source of current, and means for connecting the ends of the resistance coil to the inner ends of the connection posts below the level of the outlet port.

10. A water heater comprising an inverted conical casing made of separable upper and lower portions and having an internal chamber, the upper portion of the casing having a recess in the top thereof, a faucet engaging washer secured in said recess, a horizontal partition separating said recess from the internal chamber, said partition having an aperture permitting the passage of water to the internal chamber, a discharge nozzle, the upper portion of the casing having an outlet port forming a communication between the top of the internal chamber and said discharge nozzle, a resistance coil mounted within said chamber, connection posts extending through the upper portion of the casing the outer ends of which are adapted to be electrically connected to a source of current, means for connecting the ends of the resistance coil to the inner ends of the connection posts below the level of the outlet port, and a post centrally arranged within the internal chamber adapted to prevent disarrangement of the resistance coil.

11. A water heater comprising an inverted conical casing made of separable upper and lower portions and having an internal chamber, the upper portion of the casing having a recess in the top thereof, a faucet engaging washer secured in said recess, a horizontal partition separating said recess from the internal chamber, said partition having an aperture permitting the passage of water to the internal chamber, a discharge nozzle, the upper portion of the casing having an outlet port forming a communication between the top of the internal chamber and said discharge nozzle, a resistance coil mounted within said chamber, connection posts extending through the upper portion of the casing the outer ends of which are adapted to be electrically connected to a source of current, means for connecting the ends of the resistance coil to the inner ends of the connection posts below the level of the outlet port, and a post centrally arranged within the internal chamber adapted to prevent disarrangement of the resistance coil, said post being integral with the upper portion of the casing and extending downwardly therefrom.

JOHN R. ACKERMAN.